United States Patent [19]

Ahmad

[11] Patent Number: 6,009,204
[45] Date of Patent: Dec. 28, 1999

[54] METHOD OF COMPRESSING A PLURALITY OF VIDEO IMAGES FOR EFFICIENTLY STORING, DISPLAYING AND SEARCHING THE PLURALITY OF VIDEO IMAGES

[75] Inventor: Subutai Ahmad, Palo Alto, Calif.

[73] Assignee: Interval Research Corporation, Palo Alto, Calif.

[21] Appl. No.: 08/956,928

[22] Filed: Oct. 23, 1997

Related U.S. Application Data

[63] Continuation of application No. 08/528,891, Sep. 15, 1995, abandoned.

[51] Int. Cl.$^6$ .................................................. G06K 9/00
[52] U.S. Cl. ................................................ 382/236; 382/238
[58] Field of Search .................................. 382/232, 233, 382/234, 235, 236, 238, 239, 240, 241, 242, 243, 244, 248, 251, 252, 253, 250, 107; 348/384, 415, 416, 420, 405, 413, 699; 358/433, 539, 530, 432, 261.2, 261.3; 364/715.02; 395/94

[56] References Cited

U.S. PATENT DOCUMENTS

| | | | |
|---|---|---|---|
| 5,157,742 | 10/1992 | Niihara | 382/236 |
| 5,177,796 | 1/1993 | Feig et al. | 382/236 |
| 5,226,093 | 7/1993 | Iwase | 382/236 |
| 5,265,180 | 11/1993 | Golin | 382/56 |
| 5,299,019 | 3/1994 | Pack et al. | 382/236 |
| 5,305,400 | 4/1994 | Butera | 382/236 |

OTHER PUBLICATIONS

Computer Graphics Animations of Talking Faces Based on Stochastic Models, N.M. Brooks et al., ISSIPNN '94, 1994 International Symposium on Speech, Image Processing and Neural Networks Proceedings, Apr. 1994, pp. 73–76.

Welsh W.J. et al., "Facial Image Coding Using Principal Components", Electronics Letters, vol. 28, No. 22, Oct. 1992, pp. 2066–2067.

*Primary Examiner*—Bijan Tadayon
*Attorney, Agent, or Firm*—Limbach & Limbach LLP; Ronald L. Yin

[57] ABSTRACT

A video image, characterized by a plurality of pixels, is compressed by deriving at least one parameter based upon principal component analysis. An image value for each video image is then determined for the one parameter. The image value associated with each video image is compared to an image value associated with another video image to determine a difference. Any one of the image values of each video image and another video image is discarded in the event the difference is below a threshold. The remaining video images are then stored. Using this method of compression, it becomes possible to search a video database to find a match between an inquiring video scene with a video database comprising a plurality of video scenes with each video scene having a plurality of video images.

27 Claims, 6 Drawing Sheets

Microfiche Appendix Included
(1 Microfiche, 21 Pages)

$$|F_1 - F_C|, \ldots |F_{C-1} - F_C|, F_C, |F_{C+1} - F_J| \;---\; |F_{J-1} - F_J|, F_J \;-------$$

or $$|F_1 - F_C|, \ldots |F_{C-1} - F_C|, I_C, |F_{C+1} - F_J| \;---\; |F_{J-1} - F_J|, I_J \;-------$$

Compression for Display and Search

From a Complex Display

To a Simple One

Without Losing Essential Information

An overview of the invention and its various uses

METHOD OF COMPRESSING A PLURALITY OF VIDEO IMAGES FOR EFFICIENTLY STORING, DISPLAYING AND SEARCHING THE PLURALITY OF VIDEO IMAGES

This is a continuation of application Ser. No. 08/528,891 filed on Sep. 15, 1995, now abandoned.

This application is submitted with a microfiche appendix containing copyrighted material, © 1995, Interval Research Corporation. The appendix consists of one microfiche with 21 frames. The copyright owner has no objection to the facsimile production by anyone of the patent document or the patent disclosure, as it appears in the Patent and Trademark Office patent file or records, or otherwise reserves all copyright rights whatsoever in the appendix.

TECHNICAL FIELD

The present invention relates to a method of compressing a plurality of video images (a video scene) such that the resultant compressed video images require less storage space than the compression methods of the prior art. In addition, the present invention efficiently displays the compressed video images, by displaying a reduced number of images or "key" images, thereby simplifying searching (by e.g. viewing by a user) of the contents of the video scene. The key images act similar to an index or a table of contents for the video scene.

BACKGROUND OF THE INVENTION

As is well known in the prior art, a video image, when digitized, requires a large amount of storage. A plurality of video images (as used hereinafter: "a video scene"), such as a movie, would require hundreds of megabytes or even gigabytes of storage, if not compressed.

Methods to compress a video scene are also well known in the prior art. One prior art method is to derive a parameter by principal component analysis for all the images of the video scene. Let us assume that each video image has N pixels. Thereafter, an image value based upon the parameter chosen by principal component analysis is determined for each of the video images. Thus, the resultant storage requirement, for one parameter, would be one image full of component values for that parameter (or N values) and one image value associated with each video image. If more than one parameter is derived for the video images, the total amount of storage required would be multiplied correspondingly.

However, even with this method, if the video scene has many video images, such as a movie, the storage required for a single value of the parameter associated with each of the video images would still be large. Since video images are displayed at a rather rapid rate, e.g., thirty times per second, a two hour video movie would require 216,000 video images (2×60×60×30) and at standard TV format would require 50 gigabyte of storage. Therefore, based on this method, for one parameter, there would still require N number of parameter component values, derived by principal component analysis, and 216,000 image values with one image value for each of the video images.

Furthermore, although storage requirement is reduced by this method, compared to the uncompressed video scene, to review or browse through the video images of this video scene would require the display of the entire collection of images, e.g. 216,000 images. To a user, viewing or searching through the entire collection of displayed images would be inefficient and cumbersome. Browsing or skimming through the entire collection of video images of the video scene would require a considerable mount of time and effort.

Another method of compression of the prior art is to choose some of the images from a video scene as reference frames. Subsequent or preceding images are compared to the reference frames, and the differences or changes are stored. Thus, data for only the reference frames and the changes thereto need to be stored.

However, in such prior art method, the reference frames are chosen based upon every nth frame. Thus, the choice of the reference frame is not optimized.

As the use of video images to capture information becomes more prevalent, a method must be found to efficiently store, display and search the plurality of video images, or the video scene. The collection of video images displayed must be categorized in a manner permitting rapid searching. Thus, not only is the compression of the video images important to minimize storage space, but the method must further facilitate the display and rapid searching of the compressed video images.

Hence, the present invention deals with the problems of video compression to minimize storage requirement as well as to permit a more efficient method of displaying and searching video images from a video scene.

SUMMARY OF THE INVENTION

In the present invention, a plurality of video images is compressed. Each image is characterized by a plurality of pixels. The method comprises the steps of deriving at least one parameter for the plurality of video images. The one parameter can be derived based upon principal component analysis. An image value is determined for each video image for that one parameter. An image value associated with each video image is compared to an image value associated with another video image to determine a difference. The difference is compared to a threshold, which can be fixed or adaptive. In the event the difference is below the threshold, only one of the image values is stored. The video images corresponding to the stored image values can be displayed and searched.

The aforementioned method can be used to compress a video database having a plurality of video images. One or more "key" video images are selected by the foregoing described method. All the other video images of the video database are compared to the "key" video images and the differences are stored. The "key" video images, by themselves, or the principal component analysis image and the parameter values determined, are also stored. Based upon this compression, all the video images of the video database can be faithfully reproduced.

In another method of the present invention, a video database has a plurality of database elements with each database element being a video scene. Each video scene is compressed based upon the foregoing disclosed compression method. The video database is searched to find a match with an inquiring video scene, also comprising a plurality of video images. The inquiring video scene may also be compressed by the foregoing disclosed compression method. The stored image values associated with the inquiring video scene are compared to the stored image values associated with each video scene from the video database to find a match between the inquiring video scene and one of the video scenes from the video database.

DETAILED DESCRIPTION OF THE DRAWINGS

Figure 1:
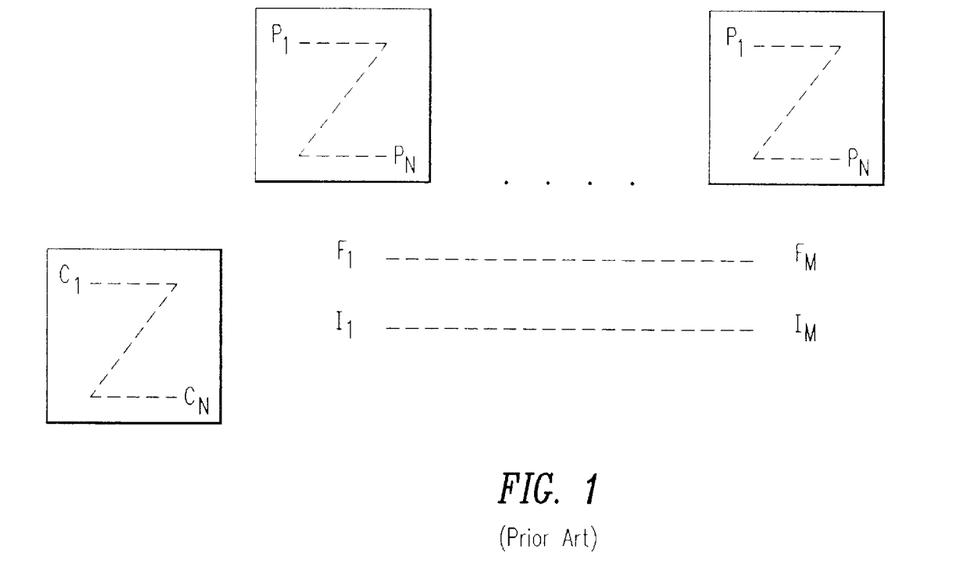
FIG. 1 is a schematic diagram showing the method of the prior art for compressing video images based upon principal component analysis.

Referring to FIG. 1, there is a shown a schematic view of the method of compression of a video scene of the prior art. The video scene comprises a plurality of video images or video frames, labeled $F_1 \ldots F_M$. Each of the video images has a plurality of pixels labeled $P_1 \ldots P_N$. The collection of video images is termed a video scene.

In the prior art, it is known to use the method of principal component analysis to derive a principal component parameter value for the video scene. The method selects a parameter for the plurality of video images $F_1 \ldots F_M$. Examples of parameters include intensity, or a particular color, or hue, or spatial frequency, etc. An image full of components, e.g., N components, for that one selected parameter is then derived. Thus, the component values $C_1 \ldots C_N$ are derived. Each of the video images $F_1 \ldots F_M$ is then compressed by determining an image value $I_1 \ldots I_M$ for each video image for the parameter component C selected. The image value $I_k$ is derived based upon:

$$I_k = \sum_{J=1}^{N} C_J P_{kJ}$$

where J is an index to the pixel number, $P_{kJ}$ is the value of the Jth pixel in frame $F_k$.

From the foregoing, it can be seen that a video scene comprising of M video images would require one video image full of data (or N values) for the component chosen by principal component analysis and M image values, with an image value $I_k$ associated with each video image $F_k$. As previously stated, in the event the video scene is long, e.g., a movie comprising of two hours, and each of the video images is displayed in 1/30th of a second, then there would be 216,000 video images (2×60×60×30). Thus, even using the prior art technique of principal component analysis to compress a video scene comprising of a plurality of video images, a considerable amount of storage space would be required, where the video scene is long, for each parameter derived from principal component analysis. In addition, to display, review or search through the 216,000 video images, would require a considerable amount of effort, despite the reduction in storage requirement.

Figure 2:
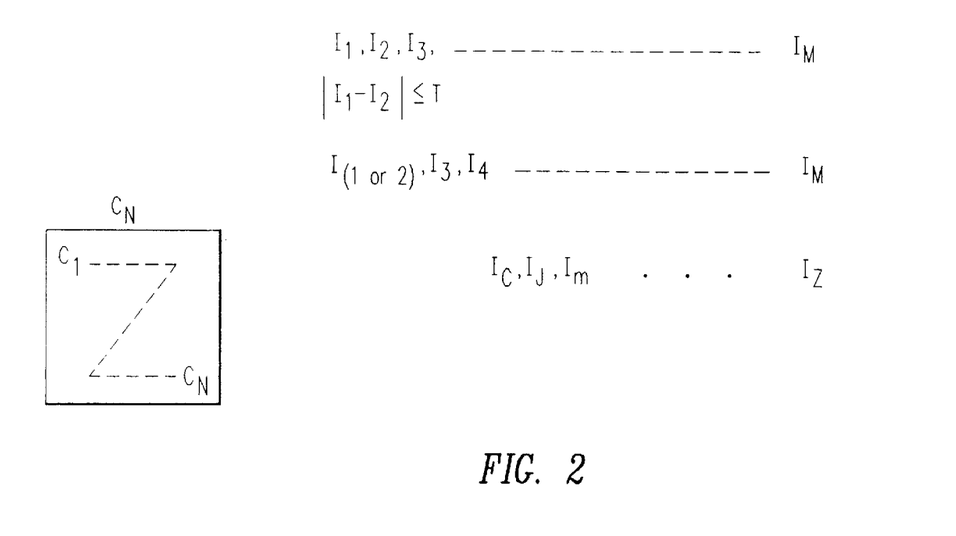
FIG. 2 is a schematic diagram showing the improved method of the present invention after a plurality of video images are compressed by the principal component analysis method of the prior art.

Referring to FIG. 2, there is shown schematically a preferred method of the present invention. The preferred method of the present invention reduces the storage requirement of compressing a video scene, using the method of principal component analysis, in which principal component analysis is performed either locally, for different regions of the same video image a different parameter is used, or globally, the same parameter is used over the entire video image. However, as will be seen, the method of the present invention is not limited by the technique of principal component analysis. For example, image values derived by discrete cosine transform, Gabor filters and wavelets can also be used. However, using the method of principal component analysis, one or more parameters is generated. Initially, the discussion will focus on the method of the present invention applied to one parameter. However, as it will be clear, the method of the present invention can be applied to compression based upon a plurality of parameters derived by principal component analysis.

As before, let us assume that using the method of compression based upon principal component analysis results in M image values obtained. These are shown as $I_1, I_2, I_3 \ldots I_M$.

Thereafter, each image value $I_k$, associated with a video image $F_k$, is compared to an image value $I_{k+1}$, associated with a video image $F_{k+1}$, which is immediately adjacent in time to the video image $F_k$. The absolute value of the difference between the two image values is obtained and is compared to a threshold value. If the difference between the two image values is less than a threshold, i.e., $$|I_k - I_{k+1}| \leq T$$

Then either the image value $I_k$ or $I_{k+1}$ is discarded. The remaining image value is stored. As will be seen the threshold T can be fixed threshold or an adaptive threshold.

This can be seen by the following example. The method of the present invention begins by comparing $I_1$ to $I_2$. If the absolute value of the difference between the two image values is less than the threshold, then let us assume $I_1$ is kept. The kept image value $I_1$ is then compared to the image value $I_3$, associated with the video image $F_3$, which is next immediately adjacent in time thereto. Again, if the absolute value of the difference is less than a predetermined threshold, then the method discards either $I_1$ or $I_3$. Again, let us assume that $I_1$ is kept. This technique continues until $I_1$ has been compared to all the rest of the image values, i.e. $I_2$ through $I_M$.

The method continues by selecting the next image value $I_k$ which has not been discarded. Let us assume $I_4$ is the next image value immediately adjacent to $I_1$, which was stored or kept. $I_4$ is then compared to each of the remaining image values $I_J$, until all of the remaining image values have been compared to $I_4$. This process continues until all of the remaining image values have been compared to each other.

If a particular image value, e.g. $I_k$ compared another image value, e.g. $I_J$ is greater than the threshold, then neither image value is discarded. The comparison continues by taking $I_k$ and comparing it to the image value of $I_{J+1}$, which is associated with the video image then immediately adjacent in time thereto.

From the foregoing it can be seen that only image values $I_k$ that have a change in magnitude greater than the threshold is kept. Further compression of the plurality of image values is obtained by discarding those image values that are close in value to the immediately adjacent in time image values.

Although the foregoing method has been described with respect to comparing an image value $I_k$ with another image value $I_{k+1}$ which is associated with video images that are immediately adjacent in time thereto, it can be readily seen that the method of the present invention is not so limited. The image value $I_k$ need not be compared to an image value $I_{k+1}$ which is associated with a video image immediately adjacent in time. $I_k$ can be compared to $I_{k+2}$, for example, or even $I_{k+3}$, representing image values which are not immediately adjacent in time thereto.

Furthermore, the method of the present invention can be used with the method of principal component analysis of the prior art where a plurality of the different parameters are derived by the method of principal component analysis. Thus, for example, the video scene comprising of the video images $F_1 \ldots F_M$ can be compressed by principal component analysis to derive a plurality of parameters $C_k$ (where k can have the values 1, 2, etc.) For each of the parameter $C_k$, an image value would be derived for each of the video image $F_1 \ldots F_M$. Thus, if, for example, three parameters were derived, the video scene of the video images $F_1 \ldots F_M$ would be compressed into:

(1) One image full of one component values $C_{11} \ldots C_{1N}$ and an image value $I_{11} \ldots I_{1M}$ associated with one of the video images $F_1 \ldots F_M$.

(2) One image full of one component values $C_{21} \ldots C_{2N}$ and an image value $I_{21} \ldots I_{2M}$ associated with one of the video images $F_1 \ldots F_M$.

(3) One image full of one component values $C_{31} \ldots C_{3N}$ and an image value $I_{31} \ldots I_{3M}$ associated with one of the video images $F_1 \ldots F_M$.

Where a plurality of parameters are derived by the principal component analysis, the method of the present invention further compresses these plurality of parameters by calculating the difference in image values associated with video images immediately adjacent in time in accordance with:

$$= \sum_{k=1}^{P} W_k (I_{ki} - I_{kj})^2$$

where k is an index to the plurality of parameters
P is the total number of parameters
$I_{ik}$ is the k parameter of image value $I_i$
$I_{jk}$ is the k parameter of image value $I_j$
$W_k$ is a weighing factor for parameter k.

For all the parameters, $W_k$ can be the same or they can be different weighing each parameter differently. Furthermore, as discussed previously, each of the image values $I_i$ and $I_j$, can be associated with video images $F_i$ and $F_j$ that are immediately adjacent in time or they are not immediately adjacent in time.

Although the above equation is disclosed for further compression using a plurality of parameters, the method of the present invention can be used by any other algorithm that calculates the difference of two image values, regardless of whether or not the image values are derived by principal component analysis.

Furthermore, as a result of the calculation of the difference, discussed heretofore, in the event the difference is less than a predetermined threshold, then one of the video image value being stored, and with the other image value not stored. The result is further compression of the stream of video image values.

As previously discussed, the threshold T can be a fixed or an adaptive threshold. The foregoing method has described the use of a fixed threshold. Alternatively, the method of the present invention provides an adaptive threshold, permitting the user (or a computer) to specify the number of image values (and correspondingly, the number of video images) to be stored. The user or the computer can either specify directly the number of image values to be stored or indirectly by specifying the amount of time for displaying the video images, whose image values are stored. In the latter example, the user can specify, for example, a five minute segment of image values, to be displayed, for a two hour video movie. Thus, there would be (5×60×30 =9000) image values stored.

The method proceeds by first comparing the image values of all consecutive video images, to find a difference thereof. Using the previous example the image values are labelled as $I_1, I_2, I_3 \ldots I_M$. Thereafter, each image value $I_k$, associated with a video image $F_k$, is compared to an image value $I_{k+1}$, associated with a video image $F_{k+1}$, which is immediately adjacent in time to the video image $F_k$. The absolute value of the difference between the two image values is obtained, i.e. $D_1(=|I_1-I_2|)$, $D_2(=|I_2-I_3|)$, $D_3 \ldots D_{M-1}(=|I_{M-1}-I_M|)$, where D is the difference. The smallest difference D is then chosen and one of the image values corresponding thereto is kept. Thus, for example, if $D_2$ is the smallest difference, then either $I_2$ or $I_3$ is kept. Let us assume that $I_3$ is kept.

Then, of the remaining differences D, the next smallest difference, i.e. $D_3$ is chosen and one of the image values is discarded.

Alternatively, the differences between consecutive image values I that remain is re-calculated, and the smallest difference is chosen. Thus, for the above example, the following differences are calculated: $D_1(=|I_1-I_3|)$, $D_3(=|I_3-I_4|)$, $D_4 \ldots D_{M-1}(=|I_{M-1}-I_M|)$. The smallest difference is chosen and one of the image values is retained.

Figure 5:
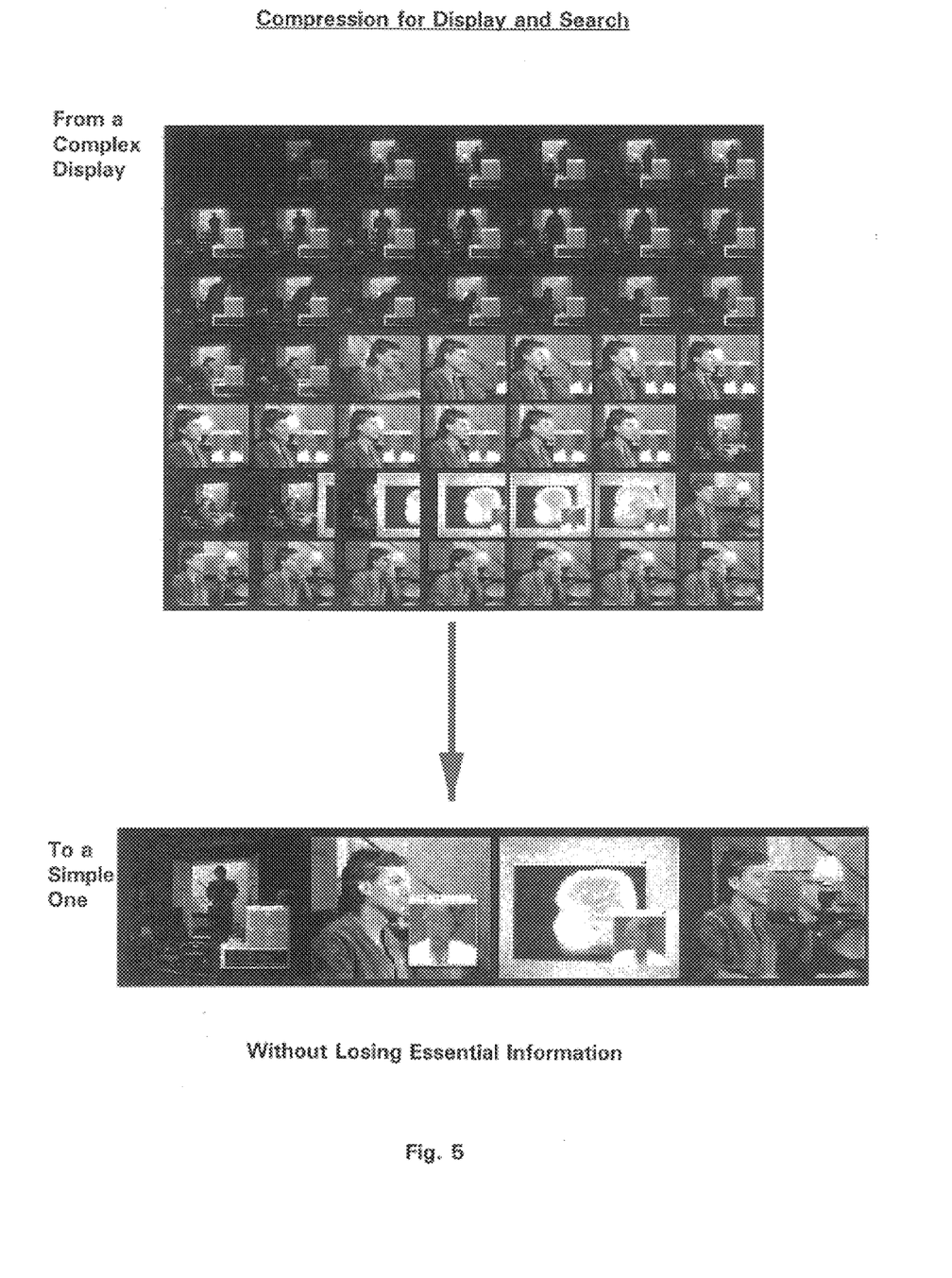
FIG. 5 is a pictorial display of the method of the present invention to efficiently and rapidly display and search a collection of video images from a video scene.

In either event, this process is repeated until the desired number of video images remain. This eliminates the problem of pre-specifying a threshold value and permits the threshold to be adaptively chosen based upon the video content of the video scene. This can be seen by reference to FIG. 5, wherein a video scene comprises forty-nine (49) video images, and using the compression method of the present invention, with the user specifying a desired result of four (4) video images, four (4) video images are so determined.

Figure 6:
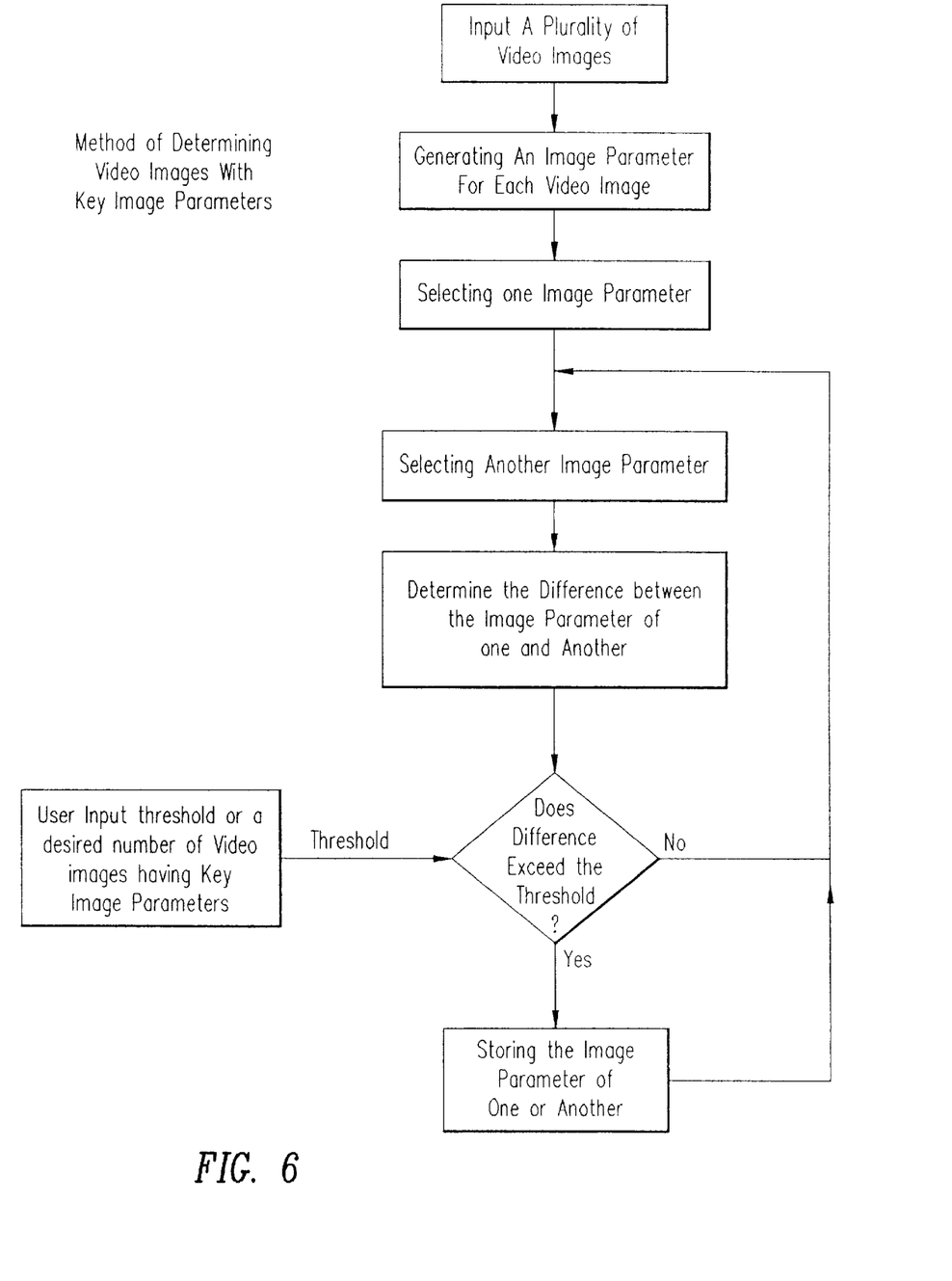
FIG. 6 is a flowchart of the method of the present invention for determining video images with key image parameters in accordance with the method of the present invention.

Referring to FIG. 6, there is shown a flowchart of a method of determining video images with key image parameters, or the selection of "key" images, in accordance with the foregoing described method of the present invention.

As can be seen from the foregoing, the method of compression of the present invention, greatly reduces the storage requirement for a video scene. In addition, however, and more importantly, the method results in a reduced number of video images, which can be readily displayed, browsed or searched. The selected video images that are displayed contain video information that demonstrate the most amount of "change" in a stream of video images. The selected video images that are displayed, are analogous to indices or a table of content for a textual work. In this manner, searching or browsing through a video scene can be greatly simplified.

It should be noted that the display of "key" video images, representing the most amount of change in video content in a video scene, does not have to be based upon video images compressed by the principal component analysis. For example, the method can be based upon other methods which determine one or more parameters for each video image. Thereafter, using the method of comparing consecutive image values, and discarding one of the image values if the difference is small (using either a fixed threshold or an adaptive threshold), as described heretofore, a number of "key" image values is calculated. The video images corresponding to the "key" image values can be displayed.

Once the "key" image values are determined, the video images corresponding to those "key" image values can be used as index images for compression of a plurality of video images (such as a movie) into compressed data, from which the uncompressed plurality of video images can be reproduced without significant loss in fidelity.

Figure 3:
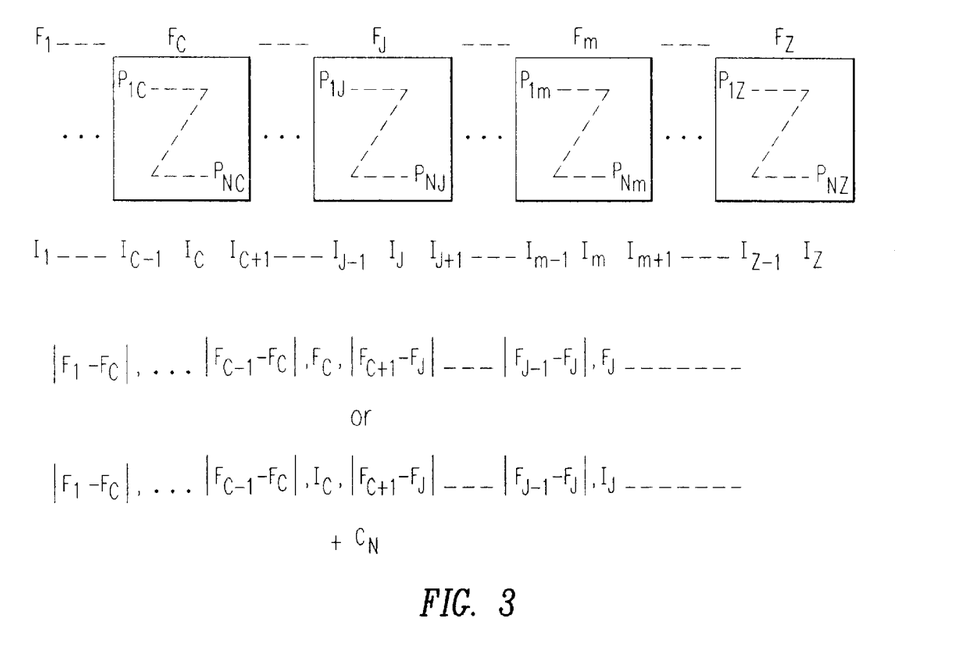
FIG. 3 is a schematic diagram showing the method of the present invention used to compress and store a plurality of video images, such as a movie.
Figure 7:
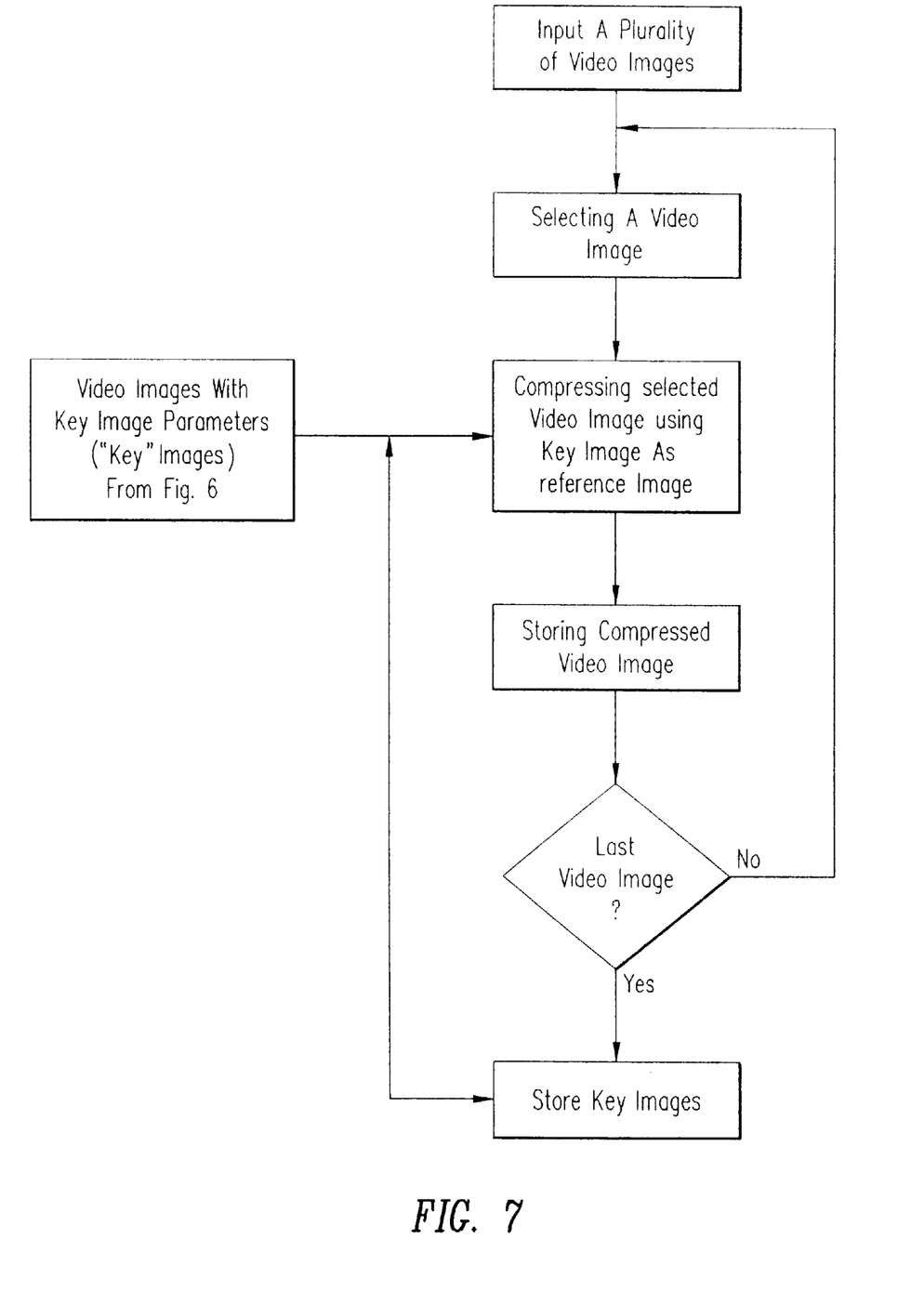
FIG. 7 is a flowchart of the method of the present invention for compressing a plurality of video images using video images with key image parameters (or reference images), determined in accordance with the method shown in FIG. 6.

Referring to FIG. 3, there is shown a schematic diagram of a method of the present invention used to compress and store a plurality of video images, such as a movie. If we assume that the movie comprises of Z frames, there would be $F_1 \ldots F_c \ldots F_J \ldots F_M \ldots F_Z$, number of video images or frame images. The frames $F_C, F_J, F_M,$ and $F_Z$ are the index images, i.e. those video images whose key image values have been determined in accordance with the method described heretofore. Thereafter, each video image that is proximate to one of the index images is compared. Thus, $|F_1-F_c|, \ldots |F_{c-1}-F_c|, F_c, |F_{c+1}-F_J|, \ldots$ are calculated. This is like the prior art method in that the difference between various video images and the index images is calculated "pixel by pixel". This difference along with the index images are then store. Alternatively, the difference along with the "key" image values representing the index images and the principal component analysis image are stored. By this compression technique, all the video images of the video base can be faithfully reproduced. A flowchart of this method is shown in FIG. 7.

As can be seen, from the foregoing, unlike the prior art method, wherein reference frames are chosen based upon every set N number of frames, the method of compression for a video database of the present invention does not limit the choice of the reference or index images to particular positions in time. The benefit of the method of the present invention can be seen by the following example. Let us assume that there are seventeen video images in accordance with the following:

$I_1, I_2, I_3, I_4, \ldots I_{17}$

Let us further assume that between images $I_4$ and $I_5$ and between images $I_{12}$ and $I_{13}$ represent the most amount of change (for example, an abrupt change in scene from one to another through the use of one camera to another). Between $I_1$ and $I_4$, camera 1 is in a fixed location or is "panning" wherein the difference between the images is minimal. Similarly, between images $I_5$ and $I_{12}$, there is assumed to be also minimal changes. Finally, it is assumed that between $I_{13}$ and $I_{17}$ there is also minimal change. Therefore, there are three video scenes comprising of images $I_1-I_4, I_5-I_{12},$ and $I_{13}-I_{17}$.

With the method of the present invention, images $I_1, I_5,$ and $I_{13}$ are determined to be index images or reference images, i.e. images whose "key" image values have been determined in accordance with the method described heretofore. The compression of the images $I_1-I_{17}$ would be to find the difference between $I_1$ and each of $I_2 \ldots I_4$, storing that difference, the difference between $I_5$ and each of $I_6 \ldots I_{12}$, and storing the difference, and the difference between $I_{13}$ and each of $I_{14} \ldots I_{17}$ and storing the difference. In addition, of course, $I_1, I_5,$ and $I_{13}$ are stored either as images or the principal component analysis from which they were derived.

In contrast, in the method of the prior art, a set number of images are chosen as the reference image. Thus, for example, if every eighth (8'th) frame, i.e. $I_1, I_9,$ and $I_{17}$ are chosen as index or reference images, then the difference between $I_1$ and $I_5$ would generate a huge difference because there is a large change in the video image data. Similarly, the difference between $I_9$ and $I_{13}$ would necessitate a large change in the video data.

In contrast, by using the images having the largest change as the reference images, compression can be optimized.

Figure 4:
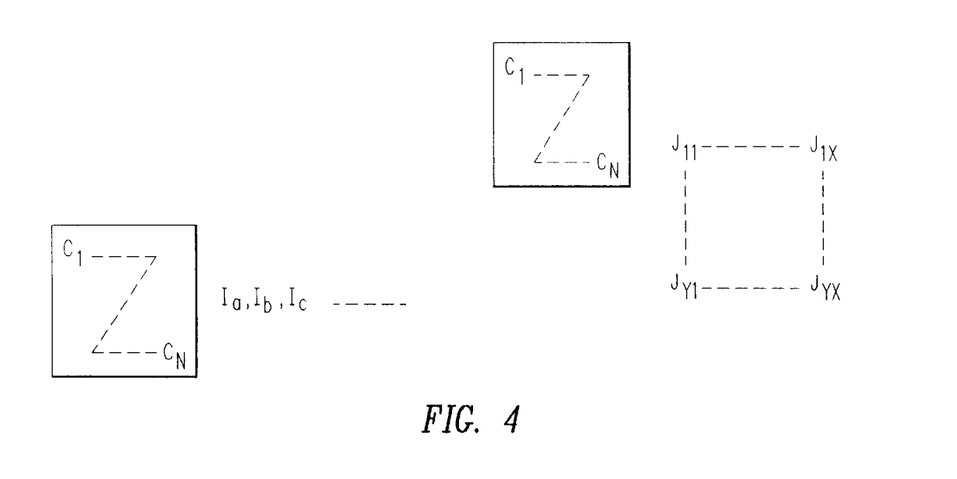
FIG. 4 is a schematic view of a method of searching a video database to determine a match between an inquiring video scene with one of the elements of the video database, each of which comprises a video scene.

With the method of the present invention by further compressing the video images and by reducing the storage requirement, it becomes possible in another method of the present invention to search a video database. The video database has a plurality of database elements with each database element being a video scene, comprising a plurality of video images. Each video database element is compressed with the method of the present invention as described heretofore. However, similar to the previous discussion, the one or more parameters for each video image need not be derived from principal component analysis. An inquiring video scene also comprises a plurality of video images. The method of the present invention permits the video database to be searched to find a match between the inquiring video scene and the video scenes of the video database. The inquiring video scene can be compressed in accordance with the method of the present invention described heretofore.

To determine if a match occurs between the inquiring video scene and one of the video database elements, the stored image values associated with the inquiring video scene are compared to the stored image values associated with each video database element to find a match between the image values. One method of comparing the matches is to find an exact match. However, often that is not possible. Another technique is to find a statistical match between the video image values of the inquiring video scene with the video image values of each of the video scenes of the video data base. For example, the following comparison can be made:

$$= \sum_{k=1}^{P} \sum_{i=1}^{L} W_k (VI_{ik} - I_{ik})^2$$

where k is an index to the plurality of parameters, and i is an index to the plurality of image values stored.

P is the total number of parameters; L is the total number of image values stored, $VI_{ik}$ is the k parameter of image value $I_i$, from the video database, $I_{ik}$ is the k parameter of image value $I_i$ from the inquiring video scene, $W_k$ is a weighing factor for parameter k. In the event the value calculated is below some threshold, then a match is declared. With this method of the present invention, it then becomes possible to determine based upon a "video clip" the source or the video database element from which the "video clip" came.

Of course, the video database need not be pre-compressed. Thus, the video database data may be compressed at the same time the inquiring video images are compressed.

Alternatively, the searching of a video database, comprising a plurality of database elements, each being a video scene, can be accomplished based upon an adaptive technique as follows. If we assume that a user is willing to wait for a period of time T to process a searching match against one of the video database elements, and the processor has a known speed/capability, that period of time T can be translated into a comparison of S number of video images. Using the adaptive comparison method described heretofore, each of the video scene of the video database, can be compressed into S number of video images, and S number of image values. A comparison is then made between the image values of the inquiring video scene and the S number of image values for each of the video database elements. The video database element having the smallest total difference would then be the closest match between the inquiring video scene, and chosen video database element. The inquiring video scene, could but need not be compressed, into the same number of video images of the video database element. Moreover, any of the prior art search algorithm can be used to compare the inquiring video scene with the compressed video images.

From the foregoing, it can be seen that with the method of the present invention, a video scene comprising a plurality of video images can be greatly compressed to save storage requirement. Furthermore, with a reduction in storage requirement it becomes possible to efficiently display, and search an inquiring compressed video scene to a video database to search the database to determine a video database element matching the inquiring video scene.

Figure 8:
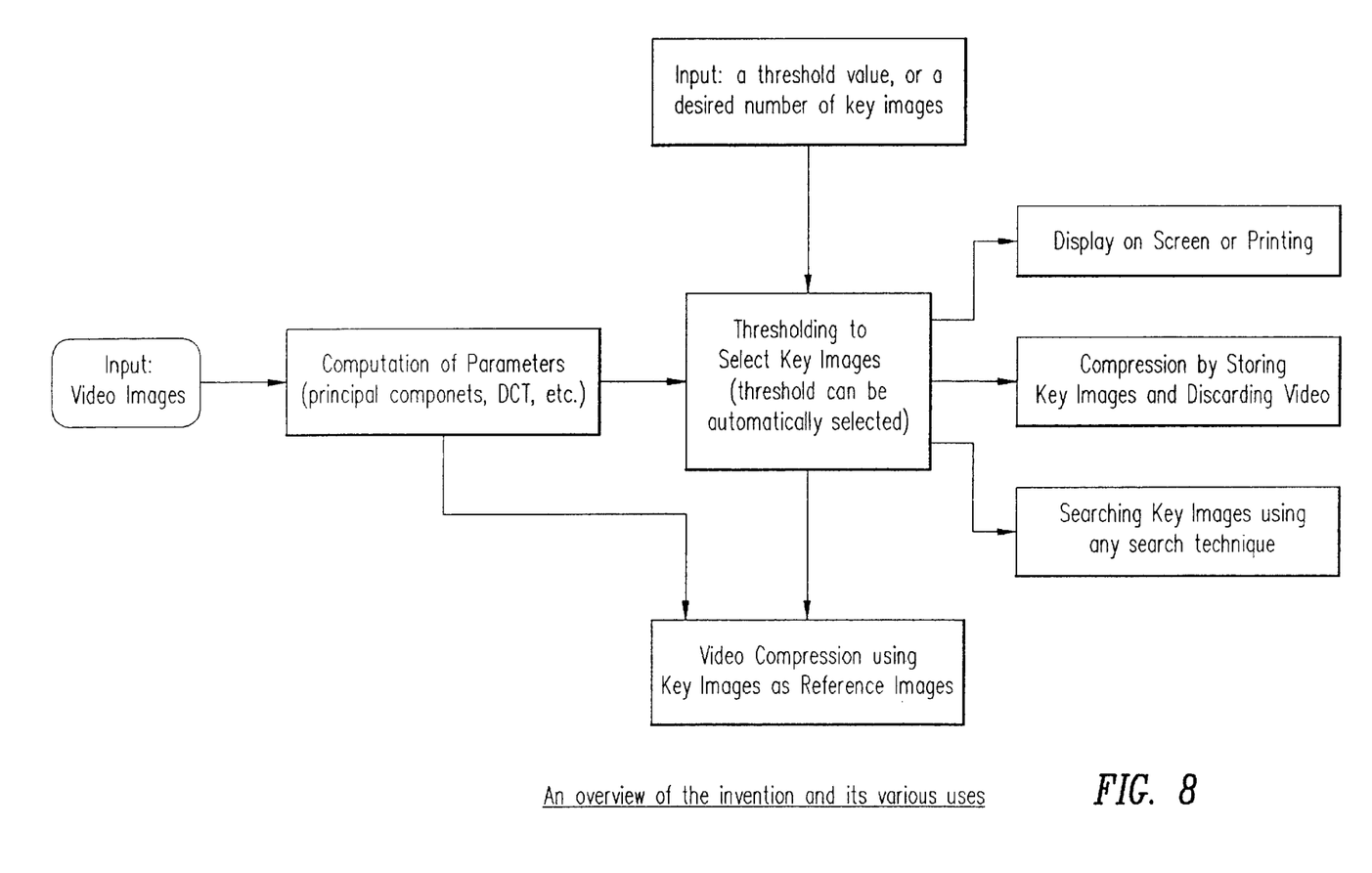
FIG. 8 is an overview of the various methods of the present invention and their uses.

In the preferred embodiment, the method of the present invention is practiced by a computer program, operating on a Silicon Graphics Workstation made by Silicon Graphics, Inc. of Mountain View, Calif. A copy of that program is set forth in Appendix. An overview of the various methods of the present invention is shown in FIG. 8.

What is claimed is:

1. A single pass method of compressing a plurality of video images into a lesser number of key images, with the number of said lesser number of key images being specified, with each image characterized by a plurality of pixels, said method comprising the steps of:

deriving at least one parameter for said plurality of video images;

determining an image value for each video image for said one parameter;

calculating a plurality of differences by comparing an image value associated with each video image to an image value associated with another video image;

discarding the smallest difference, and one of the video images associated with an image value of said smallest difference; and continuing with said step of discarding until the number of video images remaining equal to said lesser number of key images.

2. The method of claim 1 wherein said another video image is immediately adjacent in time to said each video image.

3. The method of claim 1 wherein said deriving step derives a plurality of different parameters, each of which is derived by principal component analysis.

4. The method of claim 3 wherein said principal component analysis is performed locally with a different parameter for a different portion of each video image.

5. The method of claim 3 wherein said principal component analysis is performed globally with the same parameter used for the entirety of each video image.

6. The method of claim 5 wherein said determining step determines a plurality of image values for each video image, with one image value associated with one parameter.

7. The method of claim 6 wherein said calculating step calculates said difference in accordance with:

$$= \sum_{k=1}^{P} W_k (I_{ik} - I_{jk})^2$$

where k is an index to the plurality of parameters

P is the total number of parameters $I_{ik}$ is the k parameter of image value $I_i$ $I_{jk}$ is the k parameter of image value $I_j$ $W_k$ is a weighing factor for parameter k.

8. The method of claim 7 wherein each of said weighing factor $W_k$ for all parameters k are the same.

9. The method of claim 8 wherein each of said weighing factor $W_k$ for all parameters k are not the same.

10. The method of claim 7 wherein $I_i$ and $I_j$ are image values associated with video images immediately adjacent in time.

11. The method of claim 7 wherein $I_i$ and $I_j$ are image values associated with video images not immediately adjacent in time.

12. The method of claim 1 wherein said one parameter is derived by discrete cosine transform.

13. The method of claim 1 wherein said one parameter is derived by Gabor filters.

14. The method of claim 1 wherein said one parameter is derived by wavelets.

15. The method of claim 1 wherein the number of key images is specified by a user.

16. The method of claim 1 wherein the number of key images is specified by a computer.

17. A single pass method of browsing by a user, a plurality of video images by compressing said plurality of video images into a lesser number of key images, with the number of said lesser number of key images being specified, with each image characterized by a plurality of pixels, said method comprising the steps of:

deriving at least one parameter for said plurality of video images;

determining an image value for each video image for said one parameter;

calculating a plurality of differences by comparing an image value associated with each video image to an image value associated with another video image;

discarding the smallest difference, and one of the video images associated with an image value of said smallest difference;

continuing with said step of discarding until the number of video images remaining equal to said lesser number of key images; and displaying said video images not discarded.

18. The method of claim 17 further comprising the step of:

displaying the video images remaining after the discarding step to said user for browsing.

19. The method of claim 17 further comprising the step of:

printing the video images remaining after the discarding step to said user for printing.

20. In a video database having a plurality of video scenes, each scene having a plurality of video images, each of said video images characterized by a plurality of pixels, a method for searching said video database to find a match to a first plurality of video images, said method comprising:

compressing the video images of each video scene by:
determining an image value for each video image for said one parameter for said video scene;

calculating a plurality of differences by comparing an image value associated with each video image for said video scene to an image value associated with another video image of said video scene;

discarding the smallest difference, and one of the video images associated with an image value of said smallest difference of said video scene;

continuing with said step of discarding until the number of video images remaining equal to said lesser number of key images;

storing said video images remaining and their image values; and comparing said image values associated with said first plurality of video images to said stored image values associated with each video scene to find a match between said first plurality of video images and one of said video scenes.

21. The method of claim 20 wherein said another video image for each scene is immediately adjacent in time to said each video image.

22. The method of claim 20 wherein said another video image for each scene is not adjacent in time to said each video image.

23. The method of claim 20 wherein said one parameter is derived by principal component analysis.

24. The method of claim 20 further comprising the steps of:

compressing said first plurality of video images into a lesser number of key images, with the number of said lesser number of key images being specified by a user, by:

deriving at least one parameter for said first plurality of video images;

determining an image value for each video image for said one parameter;

calculating a plurality of differences by comparing an image value associated with each video image to an image value associated with another video image;

discarding the smallest difference, and one of the video images associated with an image value of said smallest difference;

continuing with said step of discarding until the number of video images remaining equal to said lesser number of key images; and storing said video images remaining and their associated image values.

25. The method of claim 20 wherein said one parameter is derived by discrete cosine transform.

26. The method of claim 20 wherein said one parameter is derived by Gabor filters.

27. The method of claim 20 wherein said one parameter is derived by wavelets.

* * * * *